(12) United States Patent
Piontek et al.

(10) Patent No.: US 12,017,572 B2
(45) Date of Patent: Jun. 25, 2024

(54) DELIVERY VEHICLE WITH A MOBILE ATTACHMENT

(71) Applicant: Deutsche Post AG, Bonn (DE)

(72) Inventors: Herr Christoph Piontek, Morsbach (DE); Oliver Kaschner, Königswinter (DE); Alexander Winnebeck, Bonn (DE)

(73) Assignee: Deutsche Post AG, Bonn (DE)

( * ) Notice: Subject to any disclaimer, the term of this patent is extended or adjusted under 35 U.S.C. 154(b) by 383 days.

(21) Appl. No.: 17/367,850

(22) Filed: Jul. 6, 2021

(65) Prior Publication Data

US 2022/0009398 A1  Jan. 13, 2022

(30) Foreign Application Priority Data

Jul. 9, 2020 (DE) .......................... 102020118167.1

(51) Int. Cl.
| | | |
|---|---|---|
| *B60P 3/00* | (2006.01) | |
| *B61D 47/00* | (2006.01) | |
| *B65D 90/00* | (2006.01) | |

(52) U.S. Cl.
CPC .............. *B60P 3/007* (2013.01); *B61D 47/00* (2013.01); *B65D 90/004* (2013.01); *B65D 90/008* (2013.01); *B65D 2590/0066* (2013.01)

(58) Field of Classification Search
CPC ........ B60P 3/007; B62D 27/06; B62D 33/077
USPC ............................. 296/22, 35.3, 24.36, 24.4
See application file for complete search history.

(56) References Cited

U.S. PATENT DOCUMENTS

| | | | | | |
|---|---|---|---|---|---|
| 3,135,544 | A | * | 6/1964 | Mickey | B60J 5/08 160/113 |
| 4,842,326 | A | * | 6/1989 | DiVito | B60P 3/42 296/10 |
| 5,498,048 | A | * | 3/1996 | Shelby, Jr. | B60P 3/14 296/24.45 |
| 8,714,632 | B2 | * | 5/2014 | Chapman | A61G 3/00 296/205 |
| 8,905,455 | B2 | * | 12/2014 | Renfro | A47B 88/57 312/286 |
| 10,624,484 | B1 | | 4/2020 | Mountford et al. | |
| 10,850,659 | B2 | * | 12/2020 | Stocks | B62D 63/025 |
| 11,312,573 | B2 | | 4/2022 | Schedlbauer et al. | |
| 11,491,641 | B2 | * | 11/2022 | Skaaksrud | B25J 19/02 |
| 11,518,291 | B2 | * | 12/2022 | Buttolo | B60J 5/0491 |
| 2010/0191615 | A1 | | 7/2010 | Thomas | |
| 2017/0197678 | A1 | | 7/2017 | Scaringe | |
| 2019/0265702 | A1 | | 8/2019 | Igata et al. | |

FOREIGN PATENT DOCUMENTS

| | | | |
|---|---|---|---|
| CH | 705800 A2 | 5/2013 | |
| CH | 705801 A2 | 5/2013 | |
| CH | 711640 A2 | 4/2017 | |

(Continued)

*Primary Examiner* — Dennis H Pedder
(74) *Attorney, Agent, or Firm* — The Webb Law Firm

(57) ABSTRACT

System, delivery vehicle and delivery container, wherein the delivery container for accommodation by a delivery vehicle has a plurality of compartments, wherein the compartments are accessible from the outside and each compartment is designed to accommodate a plurality of packages. Furthermore, a plurality of closure elements are provided for closing the compartments and a connecting element is provided for connection to a delivery vehicle.

16 Claims, 2 Drawing Sheets

(56) References Cited

FOREIGN PATENT DOCUMENTS

| | | | |
|---|---:|---|---|
| CH | 711641 | A2 | 4/2017 |
| DE | 9106352 | U1 | 8/1991 |
| DE | 4412097 | C1 | 6/1995 |
| DE | 4412091 | A1 | 10/1995 |
| DE | 4419602 | A1 | 12/1995 |
| DE | 102006025876 | A1 | 12/2007 |
| DE | 102008059311 | A1 | 6/2010 |
| DE | 102009020388 | A1 | 10/2010 |
| DE | 102016011461 | A1 | 4/2017 |
| DE | 102016209099 | A1 | 7/2017 |
| DE | 202016005986 | U1 | 1/2018 |
| DE | 102017011550 | A1 | 7/2018 |
| DE | 102017000776 | B4 | 9/2018 |
| DE | 102018114101 | A1 | 12/2019 |
| DE | 102018122990 | A1 | 3/2020 |
| DE | 102018124771 | A1 | 4/2020 |
| DE | 102019129065 | A1 | 4/2020 |
| DE | 102019208682 | B3 | 6/2020 |
| DE | 102019208682 | B3 * | 6/2020 |
| EP | 61127 | A * | 9/1982 ............... B62B 3/00 |
| EP | 0061127 | A2 | 9/1982 |
| EP | 0686437 | A2 | 12/1995 |
| EP | 1300348 | A1 | 4/2002 |
| EP | 3626531 | A1 | 3/2020 |
| EP | 3571143 | B1 | 2/2023 |
| KR | 101721234 | B1 * | 3/2017 |
| WO | 9527571 | A1 | 10/1995 |
| WO | 2017060149 | A1 | 4/2017 |
| WO | 2018060443 | A1 | 4/2018 |
| WO | 2018112490 | A2 | 6/2018 |

\* cited by examiner

Note: closure elements 26 can be selected from doors or roller gates

DELIVERY VEHICLE WITH A MOBILE ATTACHMENT

CROSS-REFERENCE TO RELATED APPLICATION

This application claims priority to German Patent Application No. 102020118167.1 filed Jul. 9, 2020, the disclosure of which is hereby incorporated by reference in its entirety.

BACKGROUND OF THE INVENTION

Field of the Invention

The present invention relates to a delivery container as well as a delivery vehicle with such a delivery container for delivering packages and other consignments. Furthermore, the present invention relates to a system for delivering packages and a method for the operation of such a system.

Today's delivery vehicles for delivering packages have a cabin and a storage compartment for storing the packages. The vehicle cabin and the storage compartment are connected. The storage compartment also has a central aisle, wherein racks for accommodating the packages are arranged next to the central aisle on both sides. In addition, the storage compartment has an exit at the end opposite the cabin. In addition, a lateral exit is often provided.

The packages are provided in a loose order on the racks of the storage compartment.

Known delivery vehicles thus have the disadvantage that on the one hand a large space for accommodating packages is unavailable due to the provision of the central aisle. Further rack space is unavailable due to the provision of the exit doors from the storage compartment.

Furthermore, the packages to be delivered must be searched for manually by the delivery person in the racks. In particular in the case of packages of different sizes, these are transported in different racks, so that easy and quick finding of the desired package is prevented.

In addition, in the case of known delivery vehicles, the storage compartment and the vehicle are firmly connected. As a result, in the event of a defect in the vehicle, the entire delivery vehicle is no longer available. However, if the delivery vehicle has previously been loaded with packages, an elaborate load changeover must be carried out to another, functioning delivery vehicle.

The object of the present invention is to create a delivery vehicle in which the packages or other consignments to be delivered can be found quickly and a larger number of packages or other consignments can be transported.

SUMMARY OF THE INVENTION

The object is achieved by a delivery container according to claim 1, a delivery vehicle according to claim 9, a system according to claim 12 as well as a method for the operation of this system according to claim 14.

The delivery container according to the invention for accommodation by a delivery vehicle has a plurality of compartments, wherein each compartment is designed to accommodate a plurality of packages or other consignments. The compartments are accessible from the outside. In particular, each compartment has an unloading opening through which a package can be removed from the respective compartment, wherein the respective unloading openings of the compartments are arranged on one or more different outer sides of the delivery container. Furthermore, the delivery container has a plurality of closure elements for closing the compartments and in particular the respective unloading openings. The closure elements ensure that no packages can fall out while travelling. Furthermore, the closure elements ensure that there is no unauthorized removal of the packages. Furthermore, the delivery container has a connecting element for connection to a delivery vehicle. The delivery container is therefore independent of the delivery vehicle and can be connected to it by the connecting element if necessary. The delivery container thus forms an independent unit, which can be easily replaced. Furthermore, the large number of compartments ensures improved ordering of the packages in the delivery container, so that easy finding is ensured. Since the compartments are also accessible from outside the delivery container, a central aisle can be omitted, which means that more space is available in the delivery container for accommodating packages. The plurality of closure elements are also arranged on one or more different outer sides of the delivery container. For the delivery of a package by the delivery person, the closure element of the respective compartment which contains the package to be delivered is opened, the package is removed from the compartment through the unloading opening and then delivered to the delivery address. Thus, the delivery container offers improved ordering, more space to hold packages and is independent of the delivery vehicle.

Preferably, the closure elements are doors or roller gates. One, several or all closure elements can be designed as doors. Alternatively, a closure element, a plurality of or all closure elements can be formed as roller gates. Of course, some compartments may be closed with doors, while other compartments may be closed by roller gates. By means of doors or roller gates, a simple system for closing the individual compartments and their unloading openings is provided, which is fault-free.

Preferably, all closure elements are arranged on an unloading side. Thus, all unloading openings are arranged on one side of the delivery container and the removal of the packages from the delivery container always takes place from the same side. In particular, the unloading side is the right side of a delivery vehicle if the delivery container is connected to a delivery vehicle, or the side that does not correspond to the driver side of the delivery vehicle (right side for right-hand traffic and left side for left-hand traffic). Thus, it is possible to remove the packages from a sidewalk or a side away from the road.

Preferably, at least one of the compartments, a plurality of or all compartments extend/s over the entire width of the delivery container. Since the compartments are accessible from outside the delivery container, a middle aisle can just be omitted. Thus, it is possible to form the compartments over the entire width of the delivery container to accommodate an increased number of packages.

Preferably, the delivery container does not have a central aisle.

Preferably, at least one of the compartments, a plurality of or all compartments is/are accessible via a loading side. In particular, the loading side is arranged opposite the unloading side, provided that the compartments extend over the entire width of the delivery container. In particular, the individual compartments have a loading opening, which is arranged on a loading side of the delivery container. Thus, loading the delivery container takes place via the loading side, whereas removal of the packages, as described above, can be carried out via the unloading side. Thus, the loading side can be formed independently of the unloading side. In particular, the loading side has a closure element or a plurality of closure elements for closing the compartments. In this case, the loading side preferably has exactly one closure element, which closes the loading openings of one of the compartments, a plurality of or all compartments at the same time. This simplifies the loading process, since it is not necessary to open individual compartments, but only to open a common closure element and then to load all compartments. In particular, the closure element is formed as a roller gate, segment gate or sliding gate.

Preferably, at least one of the compartments, a plurality of or all compartments is/are arranged to slope, in particular starting from the loading side to the unloading side. In this way, the packages, which are ordered in particular on the loading side in the respective compartments, can be moved towards the unloading side and can be removed here by the delivery person. The movement of the packages can be passive only by providing the slant and the effect of gravity, so that the packages slide, roll or the like along the slope. Alternatively, an active movement can be carried out, for example, by a roller drive or the like. Even if loading takes place through the unloading side of the individual compartments and the compartments do not extend over the entire width of the delivery container in particular, the slopes of the compartments ensure that the packages are always moved towards the unloading opening.

Preferably, at least one of the compartments, a plurality of or all compartments at least partially has/have at least one active conveying element for moving the packages within the compartments, for example in the form of a roller conveyor with at least one driven roller. In particular, the active conveying element extends over the entire bottom surface of the respective compartments. Alternatively, at least partially at least one passive conveying element is provided, for example in the form of a sliding surface or a roller conveyor without a drive, over which the packages can be moved by sliding within the compartments without an active drive. In particular, at least one passive conveying element extends over the entire bottom surface of the respective compartments. Alternatively, passive conveying elements and active conveying elements are combined within one of the compartments. Different compartments may be designed differently with regard to the provision of active and passive conveying elements. For example, in the case of compartments for lighter packages, the bottom surface may be formed as a sliding surface, whereas compartments for heavy packages have a driven roller conveyor, so that it is always ensured that the packages can be easily moved within the respective compartments, in particular towards the unloading opening.

Preferably, at least one of the compartments, a plurality of or all compartments is/are designed as drawers. In particular, a combination of drawers and compartments is provided for flexible storage of packages. For example, drawers can accommodate more sensitive packages or smaller packages.

Preferably, at least one of the compartments, a plurality of or all compartments has/have a stop element. The stop element is provided in the region of the unloading opening. The package slides against the stop element, wherein the stop element ensures that when the closure element of the respective compartment is opened by the delivery person the package does not fall out of the respective compartment.

Preferably, at least two compartments are of different sizes. Thus, it is possible to provide compartments for packages of different sizes, so that the packages can be sorted within the delivery container according to the size of the packages. This allows the packages to be stored in the compartments of the appropriate size in a space-saving manner and thus more packages to be accommodated in the delivery container.

Preferably, each compartment has an indicator element for indicating the compartment for removing a package. In particular, the indicator element is arranged on the closure element. In particular, the indicator element is an optical indicator element such as an LED, an acoustic indicator element or a mechanical indicator element. In particular, the closure element is used as an indicator element, wherein the closure element is opened to indicate the corresponding compartment. The indicator element indicates the compartment that contains the next package to be delivered. Thus when the delivery person arrives at the next delivery address, the indicator element indicates the compartment containing the package or packages to be delivered at the corresponding delivery address. This makes it much easier and faster for the delivery person to find the package. At the same time, confusion about packages and thus incorrect delivery are prevented. In particular, each compartment can have a combination of indicator elements. For example, a mechanical indicator element may be provided by opening the corresponding closure element, combined with an acoustic indicator element, which generates a clicking noise and thus also indicates the relevant compartment.

Preferably, an actuator unit is provided for unlocking one of the closure elements. In particular, in each case an actuator unit is provided individually for unlocking each of the closure elements. Thus, the closure elements of the unloading side can be individually controlled and thus only the closure element which is required for the removal of the relevant package can be opened.

Preferably, an actuator unit is provided for unlocking a safety device for the closure element of the loading side. In this case, the safety device can prevent the opening of the closure element, so that unauthorized removal of the packages is prevented. Alternatively or additionally, unintentional closing of the closure elements of the loading side is prevented by the actuator unit for unlocking a safety device for the closure element of the loading side. If, for example, the closure element of the loading side is a sliding gate, which is moved upwards for opening, the safety device prevents an unintentional descent of the sliding gate. The safety device is only unlocked by activating the actuator unit, so that the sliding gate is closed/can be closed.

Preferably, a solar cell is provided on an upper side of the delivery container for supplying power. Other elements of the power supply may also be provided, such as a current transformer, a battery or the like.

Preferably, the delivery container has a control unit, which is in particular connected to the solar cell and/or a battery for a power supply. Furthermore, the control unit is preferably connected to the provided indicator elements and/or actuator units. These may be the actuator units of the unloading side and/or the loading side. Thus, suitable control of the indicator elements and the respective actuators units by the control unit is guaranteed. Due to the power supply by the solar cell and/or battery, the delivery container is therefore self-sufficient, requires no further power supply and an electrical connection of the delivery container to a delivery vehicle is therefore not required, but may still be possible for charging a battery or the like.

Preferably, the delivery container has rollers on its underside for moving the delivery container. This simplifies the handling of the delivery container. In particular, a roller brake is also provided, so that mechanical braking of the movement of the roller container is possible.

Preferably, standing boards are arranged below the compartments on the unloading side, wherein the standing boards can be moved from a retracted position to a deployed position. Thus, by means of the standing boards the delivery person can also reach the upper compartments of the delivery container and safely remove packing pieces there. In particular, the standing boards are manually moveable from the retracted position to a deployed position and vice versa. Alternatively, an actuator is provided to move the standing boards from the retracted position to the deployed position or vice versa. Preferably, a sensor is provided, which detects the position of the standing boards. The sensor signal is passed on, in particular to the control unit of the delivery container and/or of the delivery vehicle to generate a warning signal if the delivery vehicle is moved and the standing boards are in the deployed position. This increases safety and damage to the delivery container or injury to passers-by or damage to objects in the environment by the deployed standing boards is prevented. In particular, the control unit can even prevent the delivery vehicle from driving off in the case of deployed standing boards.

Preferably, the connecting elements have a locking device to prevent unintentional release of the delivery container from the delivery vehicle.

Preferably, connecting bolts are provided as connecting elements for the connection of the delivery container to a delivery vehicle. In particular, the connecting bolts have a locking mechanism, for example formed as cross bolts, so that unintentional release of the delivery container from the delivery vehicle can be prevented.

Furthermore, the present invention relates to a delivery vehicle with a vehicle base and a delivery container as described above. The vehicle base and the delivery container are connected by the connecting elements of the delivery container, in particular in the form of connecting bolts.

Preferably, the delivery container and the vehicle base are reversibly connected to each other, so that replacement of the delivery container is simplified.

Preferably, the delivery vehicle has exactly one delivery container.

Preferably, the unloading side is arranged on the side of the delivery vehicle. This is in particular the passenger side or the right side, so that removal of the packages from a sidewalk or a side facing away from the road is possible. This ensures the safety of the delivery person.

Preferably, the vehicle base has a bulky material box for the accommodation of bulky material, which can in particular be closed by means of a roller gate or a door. In this case, the bulky goods box is arranged in particular between the cab and the delivery container. Thus it is also possible to transport and deliver large packages as bulky goods with the delivery vehicle.

Preferably, there is no passage between the cab of the vehicle base and the delivery container. In particular, since the delivery container does not have a central aisle, it is not necessary to enter the delivery container and it is therefore not possible. A passage can therefore be omitted.

Preferably, the vehicle base has a generator and/or a control unit, wherein the vehicle base is connected to the delivery container by means of a wired connector. Thus, a power supply for the delivery container is ensured by the generator of the vehicle base. At the same time, control of the function of the delivery container can be ensured centrally by the control unit of the vehicle base.

Alternatively, the vehicle base has a generator and/or a control unit, wherein the vehicle base has contact elements and wherein the delivery container has corresponding contact elements, wherein the contact elements of the vehicle base come into contact with the contact elements of the delivery container when connecting the delivery container to the vehicle base for the transmission of current and/or control signals. Thus, an electrical connection between the vehicle base and the delivery container is established simultaneously by connecting the delivery container to the vehicle base. An additional work step is omitted.

Alternatively, the vehicle base and the delivery container are not electrically connected. In particular, if the delivery container is self-sufficient and has its own power supply and control unit, connecting the delivery container electrically to the vehicle base may be omitted. This simplifies connecting the delivery container to the vehicle base and reduces sources of error.

Preferably, the delivery vehicle has a total weight of less than 3.5 t including the maximum permissible load. In particular, the delivery vehicle has a weight of less than 2 t, preferably less than 1.8 t and more preferably less than 1.6 t. As a result, the delivery vehicle is small and can thus reach any delivery address without being subject to traffic restrictions. Furthermore, the delivery vehicle is not subject to any weight restrictions and can be driven with a normal passenger car driving license.

Furthermore, the present invention relates to a system for the delivery of packages with a delivery vehicle as described above. Furthermore, the system has a loading station for loading the delivery container.

Preferably, the system has an unloading station for unloading undelivered packages from the delivery container.

Preferably, the unloading station has a guide, wherein by means of the guide the loading side and unloading side of the delivery container are arranged at different heights, so that packages can slide out of the loading side. In particular, guide elements are provided for this purpose in the unloading station, which are arranged according to the individual compartments in order to receive the packages that slide out of the loading side and forward them for further processing. The guide, for example, is designed as a shaft guide. In particular, if the delivery container has rollers on its underside, the delivery container can be pushed onto the shaft guide by means of these rollers, so that the packages can slide out of the loading side. The guide is designed so that the different heights ensure that the packages can slide out of the loading side even if the compartments are inclined.

Preferably, the system has a terminal, wherein the terminal is connected to the control unit of the delivery vehicle and/or the delivery container to control the functionality of the delivery container and in particular for unlocking the closure elements of the individual compartments. In this case, the connection of the terminal to the control unit is carried out in particular by means of a wireless communication connection. By means of the terminal, the delivery person can thus control the unlocking of the locking elements of the respective compartments, so that the corresponding compartments are opened for the removal of the packages. Alternatively, control is carried out by means of the terminal using the delivery address, so that automatic opening of the respective compartments is enabled.

Preferably, the terminal is designed to display a delivery route and/or the next delivery address and/or status information such as remaining number of packages, remaining delivery time, congestion information on the delivery route or the like. A delivery route can also be received or updated by the terminal, which is then given to the delivery person.

Preferably, the delivery container has a marking, wherein the terminal is designed to capture the marking and to download a delivery route, in particular from a server. This ensures that the correct delivery container is associated with the correct delivery route. The marking can be in the form of a unique feature, especially as a QR code, an ID barcode, a numerical code or the like.

Furthermore, the present invention relates to a method for operating a system as described above with the steps:

Loading a delivery container with packages;
Driving to destination addresses along a delivery route; and
Delivering the packages to the respective delivery addresses.

Preferably, the delivery container is connected to the vehicle base before loading the delivery container. Alternatively, loading the delivery container is carried out first and then the loaded delivery container is connected to the vehicle base. This has the advantage that loading can take place regardless of the presence of a vehicle base. This will make delivery processes more flexible.

After driving to a delivery address, the delivery preferably includes the steps: Releasing a compartment by means of the terminal, whereby unlocking and/or automatic opening of the respective locking element of the compartment takes place;

Removal of a package;
Closing the compartment; and
Transfer of the package to the recipient.

This is followed, if necessary, by confirming the receipt of the package by the recipient, preferably also on the terminal. Subsequently, a new delivery address is approached, and a new delivery of another package is carried out.

Preferably, the release of the compartment by means of the terminal is carried out manually. Here, the delivery person selects a compartment, which is to be released for opening the respective compartment and for removing the package. Alternatively, the compartment is released by selecting a delivery address. Here, the delivery addresses can be displayed in a list according to the order in the delivery route, wherein the delivery person selects the current delivery address to release the compartment and remove the package. Alternatively, the compartment is released based on the position of the terminal, so that a compartment can only be released if the terminal is located at a position near the delivery address. This ensures that a correct delivery address is selected.

Preferably, after loading, the delivery containers are initialized by means of the terminal with the steps:

Determining an identification of the delivery container and
Providing a delivery route based on the determined identification.

This ensures that the correct delivery container is assigned to the correct delivery route and that the packages arrive reliably at the delivery address.

Preferably, packages which have not been delivered or could not be delivered are unloaded after driving along the entire delivery route, in particular via the unloading side of the delivery container, for example by providing an unloading station as described above.

Preferably, the loading takes place within a compartment in an order of delivery. Thus, the closer a package is to the unloading opening of the respective compartment, the earlier the delivery address is reached on the delivery route. If a first package is delivered at a first delivery address and a second package is delivered at a following delivery address on the delivery route, the second package is arranged after the first package starting from the unloading opening of the respective compartment. In this case, individual packages can be provided in different compartments, in particular corresponding to their size. Packages of delivery addresses which follow directly in succession along the delivery route do not have to follow each other directly in one compartment but can be distributed to different compartments. However, a package which is arranged further forward in the order of the packages is always delivered earlier in each compartment. For loading, this means that the first package is loaded first from the loading side and then the second package. If the individual compartments are loaded through the unloading opening, the unloading sequence naturally reverses.

Preferably, the delivery route has at least two segments, wherein each segment comprises a sequence of a plurality of delivery addresses, wherein individual compartments are loaded with packages of a segment of the delivery route, in particular in the order of delivery according to the respective segment. Thus, a first compartment has packages of a first segment of the delivery route, wherein within this compartment the respective packages are arranged in the order of delivery along the first segment. Another compartment has packages of another segment, wherein packages are arranged in the further compartment according to the order of delivery of the further segment. This allows the exchange of individual segments during delivery to adapt the delivery route to current conditions. Re-sorting of the packages is therefore not necessary for a segment-by-segment adjustment of the delivery route. Due to the segmentation of the delivery route, only the order of the segments is adjusted, while maintaining the delivery route within each segment. Thus, the packages can still be removed from the individual compartments in the order of delivery.

Preferably, the terminal is designed to receive status information, such as congestion, blockages, delays or the like along the delivery route, wherein an adjustment of the delivery route is made by swapping and/or skipping segments according to the status information. For example, if a part of the delivery route is blocked or closed, the segments of the delivery route are re-sorted, wherein the arrangement of the packages within the individual compartments can be maintained and re-sorting of the individual compartments is not necessary. Only the order of the compartments changes according to the change of the travelled segments of the delivery route.

BRIEF DESCRIPTION OF THE DRAWINGS

In the following, the invention is explained in more detail on the basis of a preferred embodiment with reference to the attached drawings. In the figures.

DETAILED DESCRIPTION

Figure 1:
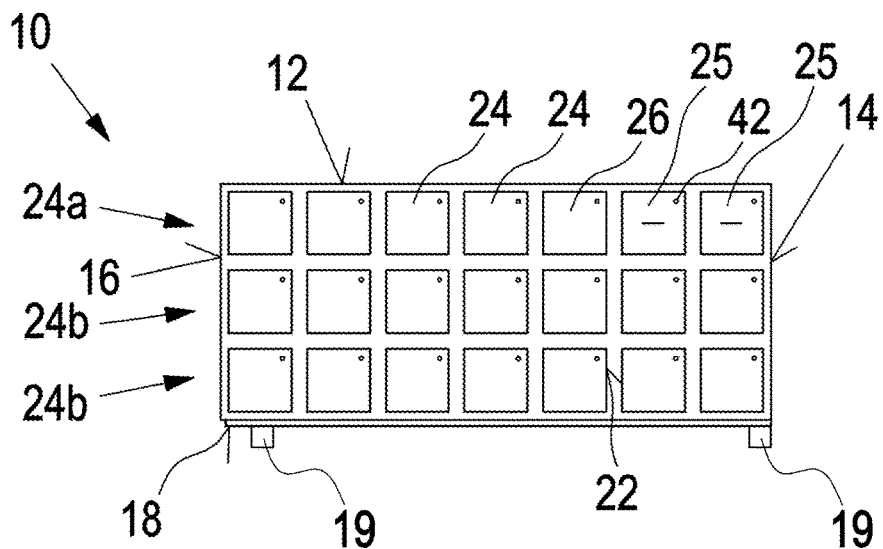
FIG. 1 shows a delivery container according to the present invention.

The delivery container 10 according to the present invention has an upper side 12, a front 14, a back 16, a lower side 18 and a left side 20 (FIG. 3) and a right side 22. Furthermore, the delivery container 10 has a plurality of compartments 24 for the accommodation of packages 28 or other consignments, which are arranged in particular on different levels 24a, 24b, 24c. The compartments 24 have unloading openings 32 which are accessible from the outside. The unloading openings 32 of the compartments 24 are closed with closure elements, in the form of doors 26, so that packages are prevented from falling out during transportation. Alternatively, the doors 26 can be at least partially in the form of roller gates. The compartments 24 extend from the left side 20 of the delivery container 10 to the right side 22 of the delivery container. Furthermore, on the left side 20 of the delivery container 10 a loading side is formed for loading the individual compartments 24. The right side 22 forms an unloading side on which packages 28 can be removed through the unloading openings 32 of the compartments 24 during delivery. In this case, the bottom surfaces 30 of the compartments 24 are formed at an angle and thus have a gradient running from the loading side to the unloading side. Thus, packages 28 are moved from the loading side over the slanted bottom surface 30 towards the extraction opening 32 due to gravity or by means of a drive. This ensures that when the door 26 is opened, the packages 28 can be reached by the delivery person and can thus be removed through the unloading opening 32.

Furthermore, in particular in the top level 24a drawers 25 are provided for the accommodation of packages or other consignments. In the example of the figures, two drawers 25 are provided as an example. The number of drawers 25 provided can vary and can be adapted to the respective application. Also, drawers 25 may be provided in other or further levels 24b, 24c, wherein in particular drawers may have different sizes for holding package of different sizes.

Furthermore, the compartments 24 can have different sizes, so that the packages 28 can be assigned to the individual compartments according to their size and thus can be arranged in the delivery container 10 in a space-saving manner. This can increase the number of packages that can be accommodated by the delivery container 10.

Figure 3:
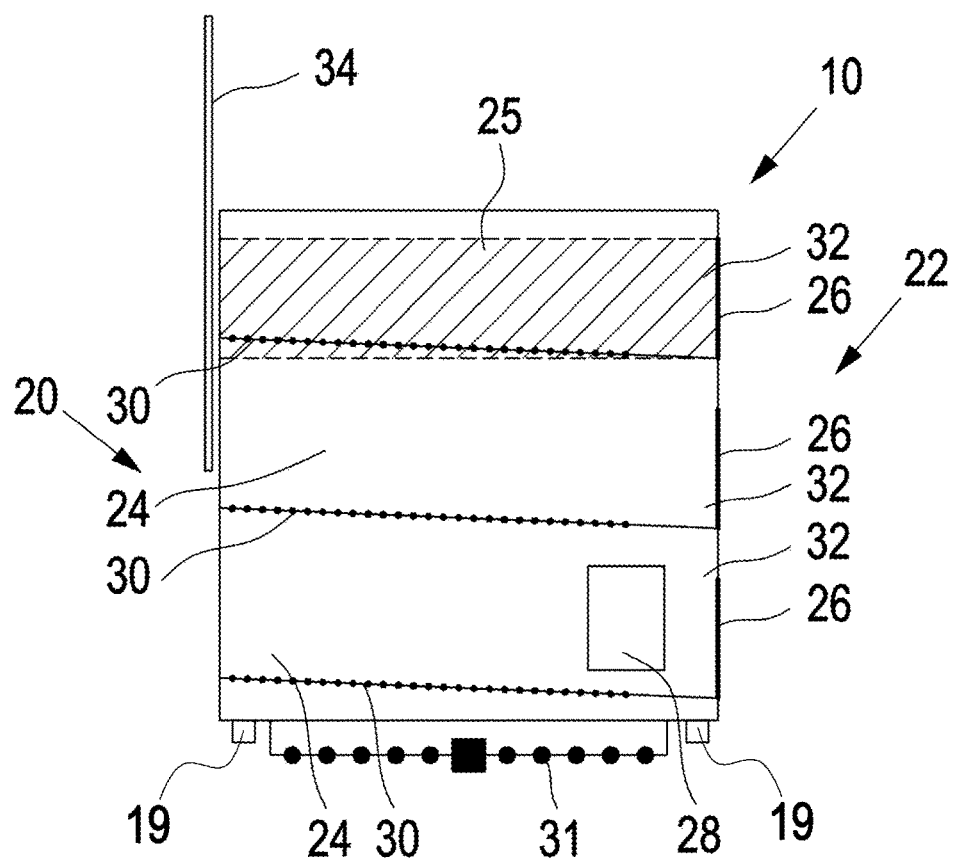
FIG. 3 shows a sectional view of the delivery container and
FIG. 4 shows a system according to the present invention.

The loading side arranged on the left side 20 has a sliding door 34. All compartments 24 of the delivery container 10 are commonly available via the sliding door 34. Thus, the loading side for all compartments 24 has a common closure element in the form of a sliding door 34, which is shown in FIG. 3 in an open position. In this position of the sliding door 34 loading of the compartments 24 can then be carried out.

Furthermore, each door 26 has an actuator for unlocking the door, so that the door 26 can be opened or will be opened on activating the actuator. An actuator can also be provided on the sliding door 34 of the loading side. The actuator of the loading side ensures that the sliding door 34 remains in an open position and does not fall unintentionally. This ensures safety during the loading process.

Furthermore, rollers 31 are arranged on the underside 18 of the delivery container 10, so that the delivery container 10 can be moved manually. In particular, a brake is provided for manual braking of the delivery container.

Figure 2:
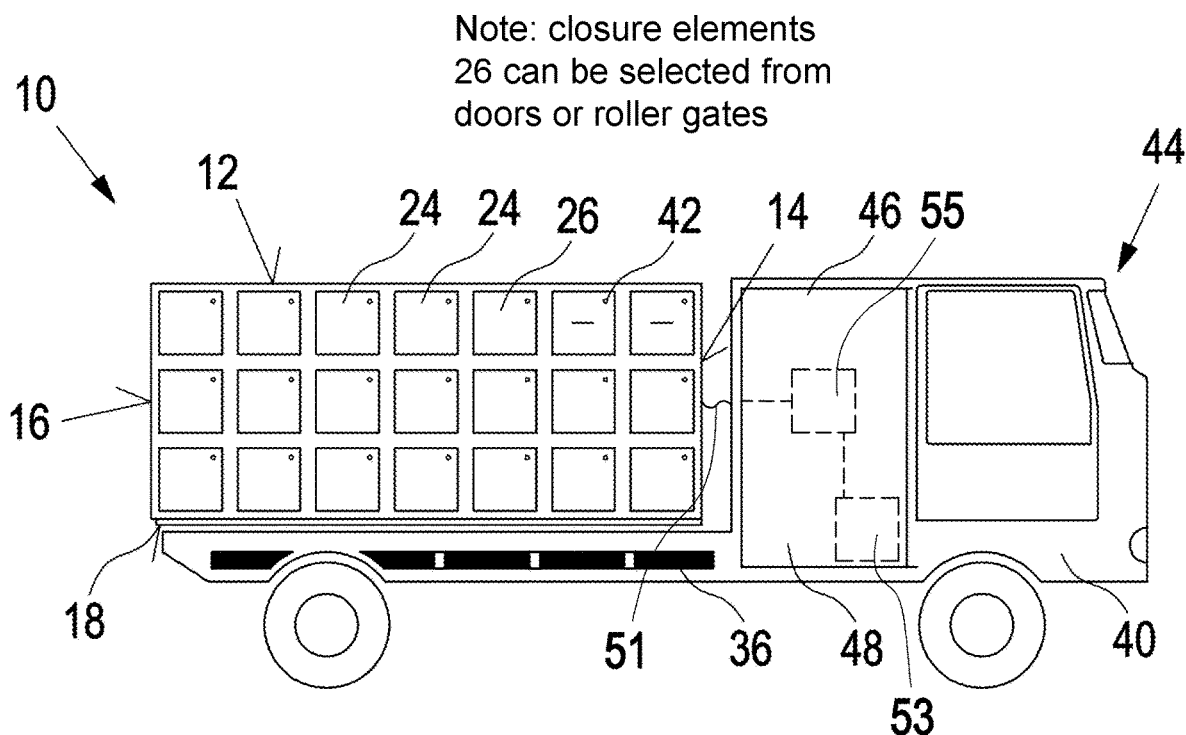
FIG. 2 shows a side view of a delivery vehicle according to the present invention

Standing boards 36 are arranged below the compartments 24 on the unloading side. The standing boards 36 are either provided in the delivery container 10 or arranged in a vehicle base 40, as shown in FIG. 2. The standing boards 36 are moved from a retracted position to a deployed position. Due to the standing boards it is possible for the delivery person to remove packages from the upper compartments 24 once the delivery person is standing on the respective standing board 36.

Furthermore, each door 26 has an indicator element in the form of an LED lamp 42. The LED lamp signals to the delivery person which compartment is to be opened for delivery of the next package at the current delivery address. Instead of an LED lamp, the indicator element can also be of a mechanical form and, for example, when the door 26 is opened can signal to the delivery person the compartment in which the next packages 28 to be delivered is located. Thus, the delivery person can immediately see where the package 28 for delivery is located. There is no need for a cumbersome search of a plurality of shelves, which reduces the delivery time for the delivery person.

FIG. 2 shows a delivery vehicle 44 with a vehicle base 40. The vehicle base 40 is connected to the delivery container 10. Therefore, the delivery container 10 comprises connecting elements 19 at the lower side 18 (FIG. 1). In particular, the vehicle base 40 accommodates exactly one delivery container 10. In particular, the delivery container 10 is secured on the vehicle base 40 by means of connecting bolts.

Furthermore, the vehicle base 40 has a bulky goods box 46, which is also closed by means of a door or a roller gate 48. The bulky goods box 46 is used to accommodate bulky goods which cannot be accommodated in the compartments 24.

The vehicle base 40 has a generator 55 and/or a control unit 53, wherein the vehicle base 40 is connected to the delivery container 10 by means of a wired connector 51. Thus, a power supply for the delivery container 10 is ensured by the generator 55 of the vehicle base 40. At the same time, control of the function of the delivery container 10 can be ensured centrally by the control unit 53 of the vehicle base 40.

Figure 4:
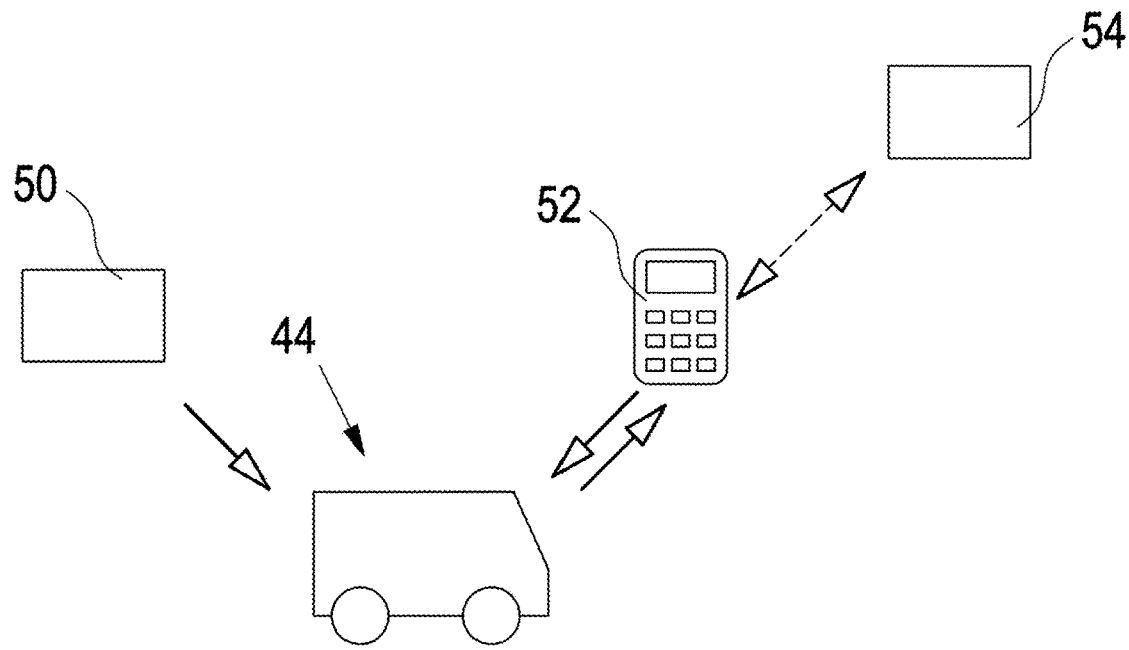

FIG. 4 shows a system according to the present invention consisting of a loading station 50, a delivery vehicle 44 and a terminal 52 for controlling the functionality of the delivery container 10. For this purpose, the delivery container 10 is connected to a control unit (not shown) for controlling the indicator elements or the actuators for opening the respective doors. The terminal 52 is connected to the control unit. The terminal 52 is connected to the control unit in particular via a wireless communications connection.

Furthermore, the terminal 52 is designed to download a delivery route with a sequence of delivery addresses, for example from a server 54. For this purpose, for example, identification of the delivery container can be carried out on the basis of a unique marking, such as a QR code or a numerical code, which is captured by the terminal, and then the corresponding delivery route is downloaded to the terminal from the server 54. If the delivery vehicle 44 then reaches the delivery address along the delivery route, this is confirmed by the delivery person or automatically captured by the terminal 52. Next, the release of the corresponding compartment 24 is transmitted by the terminal 52 to the control unit, which activates the corresponding actuator for the release of the door 26 of the corresponding compartment 24. Then the door is opened (for example by a spring force) or can be opened by the delivery person. The corresponding compartment 24 contains the package belonging to the delivery address, which is removed from compartment 24 by the delivery person and then delivered. The delivery person closes the door 26 and continues to follow the delivery route.

In the individual compartments 24 the packages 28 are arranged according to an order of delivery, so that a package which has to be delivered earlier on the delivery route is arranged within a compartment starting from the unloading opening 32 in front of packages which have to be delivered later on the delivery route. This ensures that the package nearest the front starting from the unloading opening 32 within a compartment is always the package within the respective compartment which will be delivered next. Re-sorting of packages within a compartment is therefore not required.

Furthermore, individual compartments 24 can be assigned to individual segments of a delivery route, wherein the packages are still arranged within the compartments according to an order of delivery within the respective segment. If, therefore, a change in the order of leaving the individual segments of the entire delivery route changes, only the sequence of the compartments to be opened changes. The order within the respective compartments per segment remains unchanged. Cumbersome re-sorting is not necessary, and the delivery route can be dynamically adapted to conditions such as traffic jams, closures or the like.

Thus, a flexible system is created, wherein more space is provided in the delivery container for the transport of packages, wherein the packages are arranged accordingly and thus finding by the delivery person is facilitated. This reduces the delivery time, and a larger number of packages can be delivered within the same time compared to known delivery vehicles.

The invention claimed is:

1. A delivery container for accommodation by a delivery vehicle comprising:
   a plurality of compartments, wherein the compartments are accessible from the outside and each compartment is designed to accommodate a plurality of packages;
   a plurality of closure elements for closing the compartments; and
   a connecting element for connection to a delivery vehicle,
   wherein at least one of the compartments extends over the entire width of the delivery container,
   wherein at least one of the compartments is accessible via a loading side, wherein the loading side is arranged opposite an unloading side,
   wherein all of the plurality of compartments have exactly one closure element that is arranged on the loading side thereof so as to permit simultaneous loading of all of the plurality of compartments, and
   wherein each of the plurality of compartments individually have exactly one closure element that is arranged on the delivery side thereof so as to permit individual unloading of each of the plurality of compartments.

2. The delivery container according to claim 1, wherein the closure elements are doors or roller gates.

3. The delivery container according to claim 1, wherein at least one of the compartments is formed on a slant.

4. The delivery container according to claim 3, wherein each compartment has an indicator element for indicating the compartment for the removal of a package.

5. The delivery container according to claim 1, further comprising rollers on an underside of the delivery container for moving the delivery container.

6. A delivery vehicle with a vehicle base and a delivery container according to claim 1, wherein the delivery container is reversibly connected to the vehicle base.

7. The delivery vehicle according to claim 6, wherein the vehicle base has a bulky goods box for the accommodation of bulky goods between a driver's cab and the delivery container.

8. The delivery vehicle according to claim 6, wherein the vehicle base has a generator and/or a control unit and the vehicle base is connected to the delivery container by means of a wired plug connector.

9. A system for the delivery of packages with a delivery vehicle according to claim 6 and a loading station for loading the delivery container.

10. The system according to claim 9, further comprising an unloading station for unloading undelivered packages, wherein the unloading station has a guide, wherein due to the guide the sides of the delivery container are arranged at different heights, so that packages can slide out of a loading side.

11. A method for operating the system according to claim 9, the method comprising:
    loading a delivery container with packages;
    driving to destination addresses along a delivery route; and
    delivering the packages to the destination addresses.

12. The method according to claim 11, further comprising the steps after driving to a delivery address:
    releasing a compartment, by means of a terminal;
    removing a package;
    closing the compartment; and
    delivering the package to a recipient.

13. The method according to claim 11, further comprising unloading undelivered packages after driving along the entire delivery route, via an unloading side of the delivery container.

14. The method according to claim 11, wherein loading within a compartment takes place in an order of delivery.

15. The method according to claim 12, wherein the delivery route has at least two segments, wherein each segment comprises a sequence of a plurality of delivery addresses, wherein individual compartments are loaded with packages of a segment of the delivery route.

16. The delivery vehicle according to claim 6, wherein the vehicle base has contact elements and wherein the delivery container has corresponding contact elements, which come into contact with each other when connecting the delivery container to the vehicle base for the transmission of current and/or control signals.

* * * * *